Patented May 19, 1942

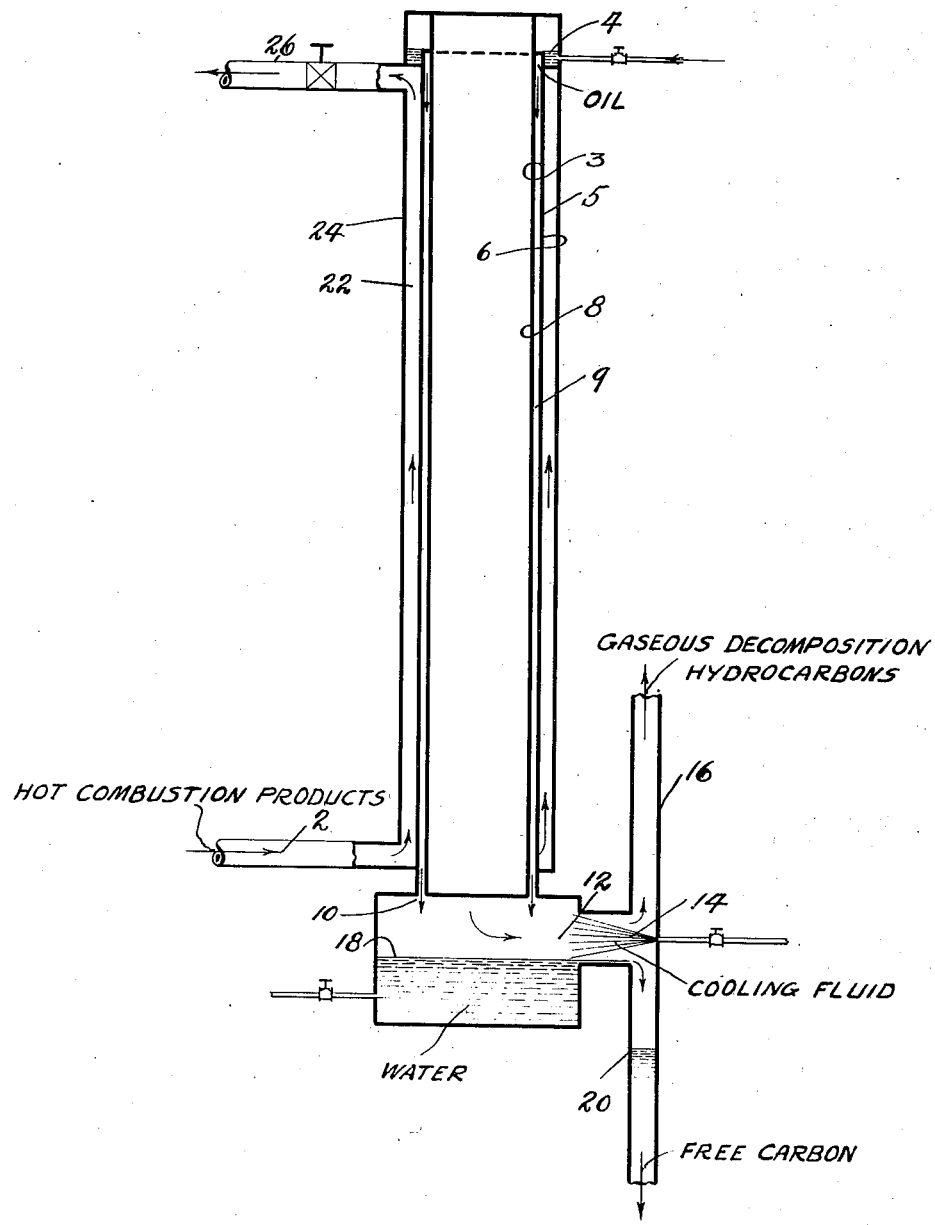

2,283,643

UNITED STATES PATENT OFFICE 2,283,643

MAKING GAS FROM OIL

Theodore Nagel, Brooklyn, N. Y.

Application September 10, 1938, Serial No. 229,309

1 Claim. (Cl. 48—211)

This invention relates to a continuous method for thermally decomposing oil to gaseous decomposition hydrocarbons and is specifically directed to converting practically all the hydrogen content of oil to gaseous decomposition hydrocarbons and eliminating the customary production of condensible reaction hydrocarbons at the expense of the yield of gaseous decomposition hydrocarbons.

"Oil" is to be considered as crude petroleum or liquids derived from crude petroleum.

My invention provides a low pressure continuous process for thermally decomposing oil to gaseous decomposition hydrocarbons in which process the pressure serves merely to overcome the resistance to mass flow through the apparatus and through subsequent operations of purifying the gas and may include the pressure required for delivering the gas into a gas holder, a total pressure of approximately not more than one atmosphere gauge.

The thermal process of the present invention consists in rapidly heating and vaporizing oil and immediately the oil vaporizes flash heating the oil vapor to a temperature at which the oil vapor flash decomposes to gaseous decomposition hydrocarbons and immediately shock cooling the gaseous decomposition hydrocarbons to prevent the gaseous decomposition hydrocarbons reacting to heavier reaction hydrocarbons that condense when cooled to atmospheric temperature.

The flash decomposing temperature attained is controlled to a selective close range temperature within the temperature range from 1300° F. to 1600° F. to produce gaseous decomposition hydrocarbons of a selective thermal value corresponding to the selective close range flash decomposing temperature, which is controlled by the weight ratio of oil to the hot combustion products that supply the heat for thermally decomposing the oil to gaseous decomposition hydrocarbons. As examples of selective close range flash decomposing temperatures used to produce selective thermal value gas: When the selective flash decomposing temperature approximates 1500° F. the thermal value of the gaseous decomposition hydrocarbons produced approximate 1300 B. t. u. per cubic foot under standard temperature pressure conditions, and when the selective flash decomposing temperature approximates 1300° F. the thermal value of the gaseous decomposition hydrocarbons produced approximate 2000 B. t. u. per cubic foot. The source of heat used by this method for decomposing oil is obtained from any suitable supply of hot combustion products as, for example, from the combustion of oil, gas or other fuels.

This process utilizes the heat from the hot combustion products by counterflow indirect heat transfer to rapidly heat and vaporize the oil and flash heat the oil vapor to a selective close range flash decomposing temperature within the temperature range from 1300° F. to 1600° F., to flash decompose the oil vapor to selective thermal value gaseous decomposition hydrocarbons. Before polymerizing reactions convert the gaseous decomposition hydrocarbons to heavier condensible reaction hydrocarbons, the gaseous decomposition hydrocarbons are shock cooled, preferably to below 900° F., to prevent the formation of condensible reaction hydrocarbons. Shock cooling is effected by direct contact mixture of the gaseous decomposition hydrocarbons with relatively cool fluid as, for example, water, saturated steam, gas.

Rapidly heating and vaporizing the oil and flash heating the oil vapor to a temperature at which the oil vapor flash-decomposes to gaseous decomposition hydrocarbons is accomplished through continuously dispersing the oil in a thin film on the surface of one side of a heat conducting member while the gaseous heating medium is flowing counterflow thereto on the other side of the heat conducting member. As the oil vaporizes the oil vapor is confined within a thin channel to contact the oil vapor with the hot surface of the heat conducting member.

The accompanying drawing is merely diagrammatic and illustrates an arrangement of apparatus suitable for practicing this invention.

Referring to the drawing: a controlled continuous supply of hot combustion products 2 and a controlled continuous supply of oil 4 come from any suitable controlled sources of supply. The oil 4 is dispersed in a thin flowing film upon the inner surface 3 of a heat conductor 5 while the hot combustion products 2 flow in the opposite direction along the opposite surface 6 of the heat conductor. Indirect heat transfer from the counterflowing hot combustion gas rapidly heats and vaporizes the oil. The internal area or volume of the heat conductor 5 is nearly filled with a central core filler 8 forming a thin annular channel or spacing 9 between the central core 8 and the heat conducting member 5 to crowd or confine the oil vapor close to the hot surface 3 of the heat conductor so as to flash heat the oil vapor to a selective close range flash decomposition temperature at 10 within the temperature range of 1300° F. to 1600° F. The resulting gaseous decomposition hydrocarbons and free carbon are shock cooled at 12 to below 900° F. by direct contact mixture with a relatively cool fluid 14 coming from any suitable source of supply. The gaseous decomposition hydrocarbons flow through 16 to any standard type steam condensing gas scrubber, while the free carbon, produced by decomposing the oil vapor, deposits on water 18 coming from a suitable source of supply and flows through 20 to a gas sealed water drain. The hot combustion products flowing upwardly in the space 22 between the outer surface of the heat conducting wall 5 and outer wall 24 pass out of the apparatus at valve controlled outlet 26.

It will be seen from the foregoing that my invention provides for the continuous conversion of practically all the hydrogen content of oil to gaseous decomposition hydrocarbons by a thermal method of flash decomposition of vaporized oil at any selective close range temperature within the temperature range from 1300° F. to 1600° F., producing gaseous decomposition hydrocarbons of selective thermal values. It will be seen also that my invention involves control of heat transfer from hot combustion products rapidly to heat and vaporize oil and flash heat the oil vapor to a temperature at which the oil vapor flash-decomposes to gaseous decomposition hydrocarbons, the gaseous decomposition hydrocarbons being shock cooled to below 900° F. before polymerizing reactions produce condensible reaction hydrocarbons at the expense of the yield of gaseous decomposition hydrocarbons.

What I claim is:

The method of decomposing hydrocarbon oil to olefinic gaseous decomposition hydrocarbons, which method comprises continuously charging hydrocarbon oil in the liquid phase into a vertically extending annular space at such a rate that the oil initially flows by gravity in the form of a film along and in contact with one surface of a heat conducting wall constituting one wall of the said annular space, simultaneously continuously flowing hot combustion products along the opposite surface of said wall from the bottom to the top thereof in such volume and at such temperature that the descending oil film will be vaporized, and the vapor temperature raised to within the temperature range from 1300° F. to 1600° F., without the formation of reaction products, to flash decompose the vapor to olefinic gaseous decomposition hydrocarbons free from reaction products, and immediately upon attainment of the said temperature shock cooling to below 900° F. to exclude polymerizing reactions.

THEODORE NAGEL.